United States Patent
Lam et al.

(10) Patent No.: US 11,995,328 B2
(45) Date of Patent: May 28, 2024

(54) SINGLE-LEVEL CELL BLOCK STORING DATA FOR MIGRATION TO MULTIPLE MULTI-LEVEL CELL BLOCKS

(71) Applicant: Micron Technology, Inc., Boise, ID (US)

(72) Inventors: Johnny Au Lam, Firestone, CO (US); Nathaniel Wessel, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/820,762

(22) Filed: Aug. 18, 2022

(65) Prior Publication Data
US 2024/0061597 A1 Feb. 22, 2024

(51) Int. Cl.
*G06F 3/06* (2006.01)
(52) U.S. Cl.
CPC ............ *G06F 3/064* (2013.01); *G06F 3/0604* (2013.01); *G06F 3/0673* (2013.01)
(58) Field of Classification Search
CPC ....... G06F 3/064; G06F 3/0673; G06F 3/0604
See application file for complete search history.

(56) References Cited

U.S. PATENT DOCUMENTS

| | | | |
|---|---|---|---|
| 10,732,877 B1* | 8/2020 | Gopalakrishnan | ........................... G11C 11/5642 |
| 10,916,316 B2* | 2/2021 | Blodgett | ............. G06F 9/30101 |
| 2014/0115235 A1* | 4/2014 | Ito | ........................ G06F 12/0246 711/103 |
| 2018/0121128 A1* | 5/2018 | Doyle | ..................... G11C 16/10 |
| 2020/0310672 A1* | 10/2020 | Cariello | ................... G06F 21/79 |
| 2022/0334747 A1* | 10/2022 | Agarwal | ............... G06F 3/0656 |
| 2023/0043733 A1* | 2/2023 | Luo | ........................ G06F 3/0644 |

* cited by examiner

*Primary Examiner* — Mark A Giardino, Jr.
(74) *Attorney, Agent, or Firm* — Harrity & Harrity, LLP

(57) ABSTRACT

Implementations described herein relate to memory devices including a single-level cell (SLC) block storing data for migration to multiple multi-level cell (MLC) blocks. In some implementations, a memory device includes multiple MLC blocks that include MLCs, with each MLC being capable of storing at least four bits of data, and multiple SLC blocks that can store data prior to the data being written to one of the MLC blocks. Each SLC block may be capable of storing different data sets that are destined for storage in different MLC blocks. The memory device may include a mapping component that can store a mapping table that includes multiple entries, in which an entry indicates a mapping between a memory location in the SLC blocks and a corresponding MLC block for which data stored in the memory location is destined. Numerous other implementations are described.

25 Claims, 9 Drawing Sheets

SINGLE-LEVEL CELL BLOCK STORING DATA FOR MIGRATION TO MULTIPLE MULTI-LEVEL CELL BLOCKS

TECHNICAL FIELD

The present disclosure generally relates to memory devices, memory device operations, and, for example, a single-level cell block storing data for migration to multiple multi-level cell blocks.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
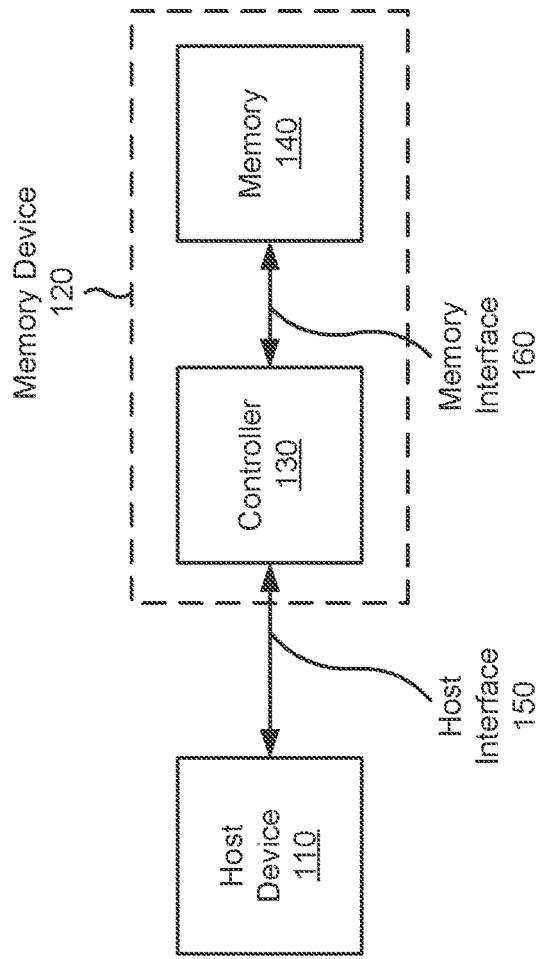
FIG. 1 is a diagram illustrating an example system associated with a single-level cell (SLC) block storing data for migration to multiple multi-level cell (MLC) blocks.

Memory devices may include a number of cells capable of storing one or more binary bits of data per cell. For example, a cell may be capable of storing one binary bit per cell, referred to as a single-level cell (SLC), or multiple binary bits per cell, referred to as a multi-level cell (MLC). Often, when a memory device writes data to an MLC cell, the memory device may perform multiple write operations to ensure the data is safely recorded. For example, when writing data to a quad-level cell (QLC) in a replacement gate (RG) type memory device, the memory device may perform a first write operation to the cell, sometimes referred to as a coarse-write operation, and then later rewrite the data to the cell using a second write operation, sometimes referred to a fine-write operation. In such cases, the data to be written to the QLC may be stored in an SLC cache before it is fully migrated to the QLC so that the data persists across one or more power cycles or so that the data is otherwise available during both the coarse-write operation and the fine-write operation.

In some examples, a memory device may be associated with a zoned namespace (ZNS). In a ZNS-type memory device, instead of many drives arbitrarily organized into one or more logical drives, one drive may appear to a host device as multiple drives assigned to different threads. In this way, a ZNS divides the logical address space of a namespace into zones. Each zone is a logical block range that is written sequentially, and which must be reset in order to be rewritten. The interface allows ZNSs to expose natural boundaries for internal device structures and to offload management of internal mapping tables to a host device. In some applications, one or more SLC caches may be dedicated to a particular zone of the ZNS. For example, in a QLC memory device, four SLC blocks may serve as a cache for each QLC block associated with a given zone, such that data destined to be written to a QLC block is cached in one or more of the four SLC blocks before ultimately being migrated to the corresponding QLC block in a manner described above (e.g., using a coarse- and fine-write process, or the like).

In some cases, a host device may require many open and/or active zones in a ZNS memory device. In such instances, the number of SLC blocks necessary to provide a cache for host data before it is ultimately migrated to an MLC block becomes onerous. For example, each QLC block associated with an open and/or active zone requires four dedicated SLC blocks to serve as a cache for the QLC block during a write process. Thus, in memory devices requiring numerous open and/or active zones, a significant portion of the available capacity of the memory device may be allocated to the SLC cache, resulting in a corresponding decrease in the available capacity available for MLC storage. In this way, ZNS memory devices that support numerous open and/or active zones suffer from reduced capacity and inefficient usage of memory resources.

Some implementations described herein enable data associated with multiple zones of a ZNS to be cached within a single SLC cache or SLC block pool. Allocating a single SLC cache in which data for multiple zones is mixed may result in a larger number of open and/or active zones to be presented to the host device while increasing MLC memory capacity by reducing the need for dedicated SLC caches for each open and/or active zone and otherwise results in more efficient usage of memory resources. These and similar benefits will become more apparent with reference to the figures and corresponding description, below.

First, FIG. 1 is a diagram illustrating an example system 100 associated with an a SLC block storing data for migration to multiple MLC blocks. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device 110 (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

As indicated above, FIG. 1 is provided as an example. Other examples may differ from what is described with regard to FIG. 1.

Figure 2:
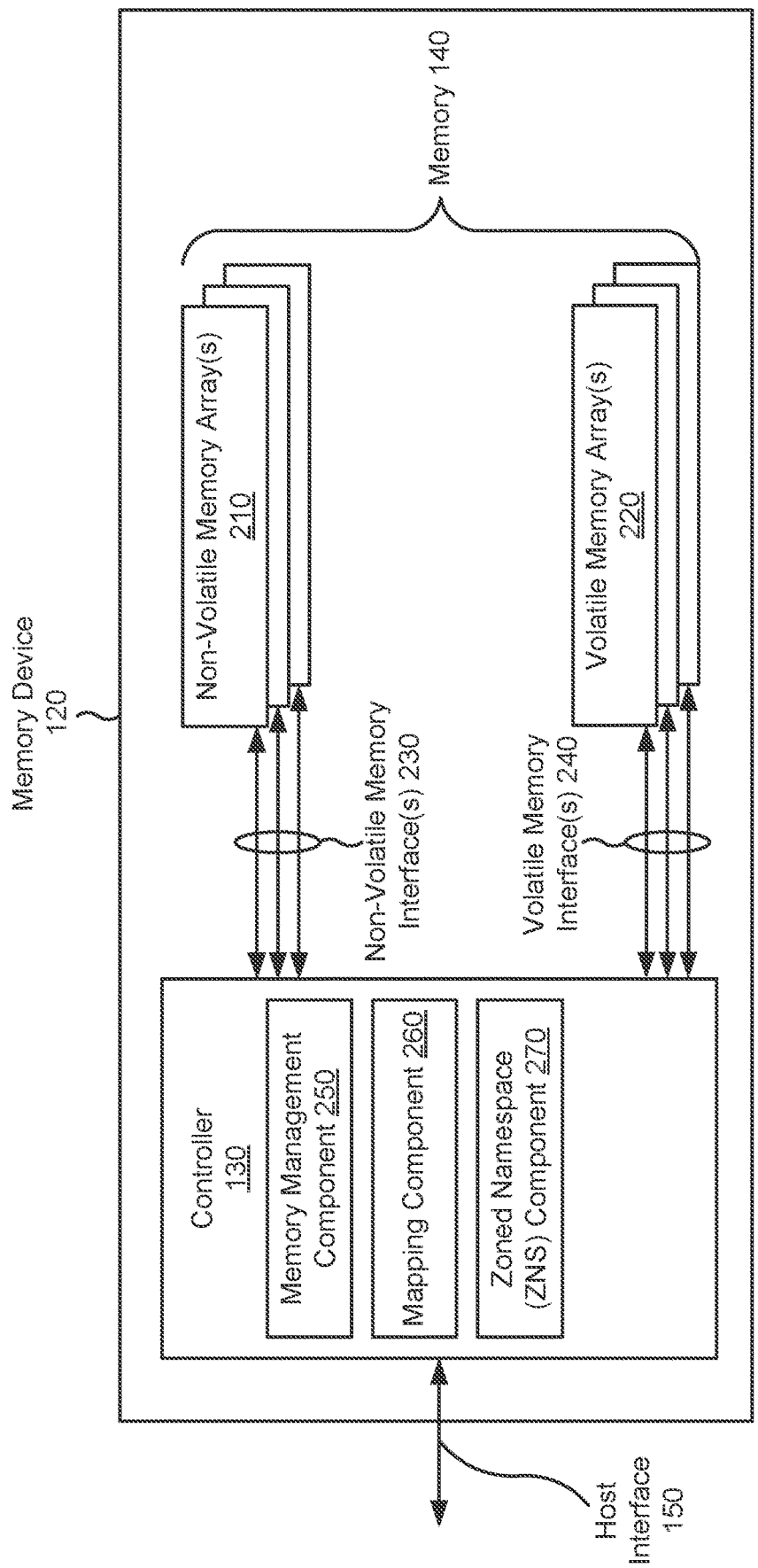
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, a mapping component 260, and/or a ZNS component 270. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The mapping component 260 may be configured to perform one or more mapping operations for the memory device 120. In some implementations, the mapping component 260 may maintain a mapping table or a similar database that maps certain blocks and/or locations within the memory 140 to other blocks and/or locations within the memory 140. In some implementations, the mapping component 260 may maintain a mapping table that includes multiple entries indicating a mapping between SLC caches (e.g., an SLC block pool and/or a location within an SLC block pool) that stores data before it is migrated to a zone of a ZNS, and a corresponding zone of the ZNS (e.g., an MLC block and/or a location within an MLC block) where the data is to be migrated.

The ZNS component 270 may be configured to perform one more operations associated with a ZNS of the memory device 120. In some implementations, the ZNS component 270 may maintain multiple open and/or active zones for use by the host device 110. The ZNS component 270 may receive, from the host device 110, data and an indication of a zone in which the data is to be stored, and/or the ZNS component 270 may write the data to the memory 140. In some implementations, the ZNS component 270 may first write data to an SLC cache and then later migrate the data to a corresponding zone. In some implementations, the ZNS component 270 may interact with the memory management component 250 and/or the mapping component 260 to update a mapping table that maps SLC caches to corresponding open and/or active zones.

Figure 4A:
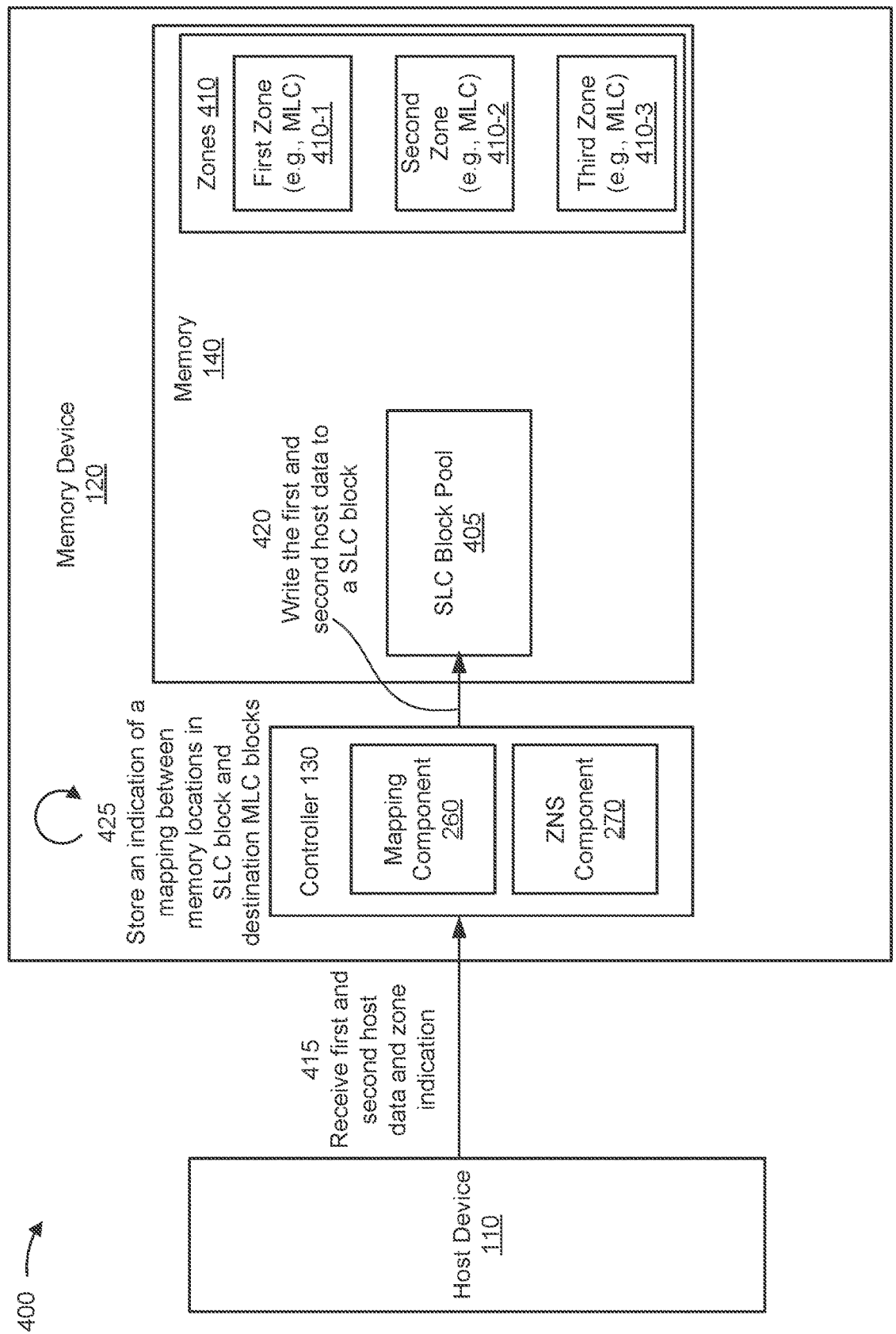
FIGS. 4A-4D are diagrams of an example implementation associated with an SLC block storing data for migration to multiple MLC blocks.
Figure 4B:
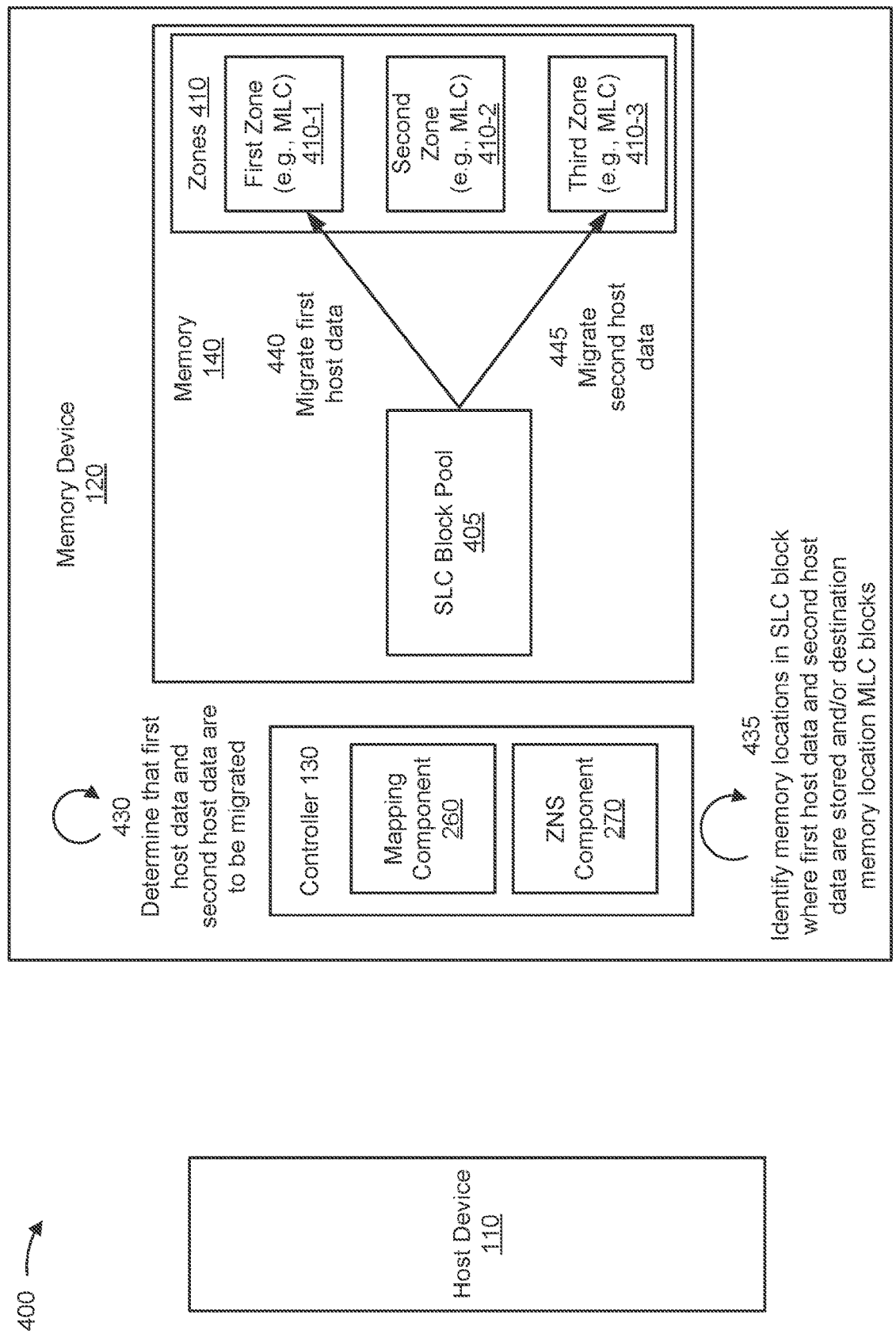
Figure 4C:
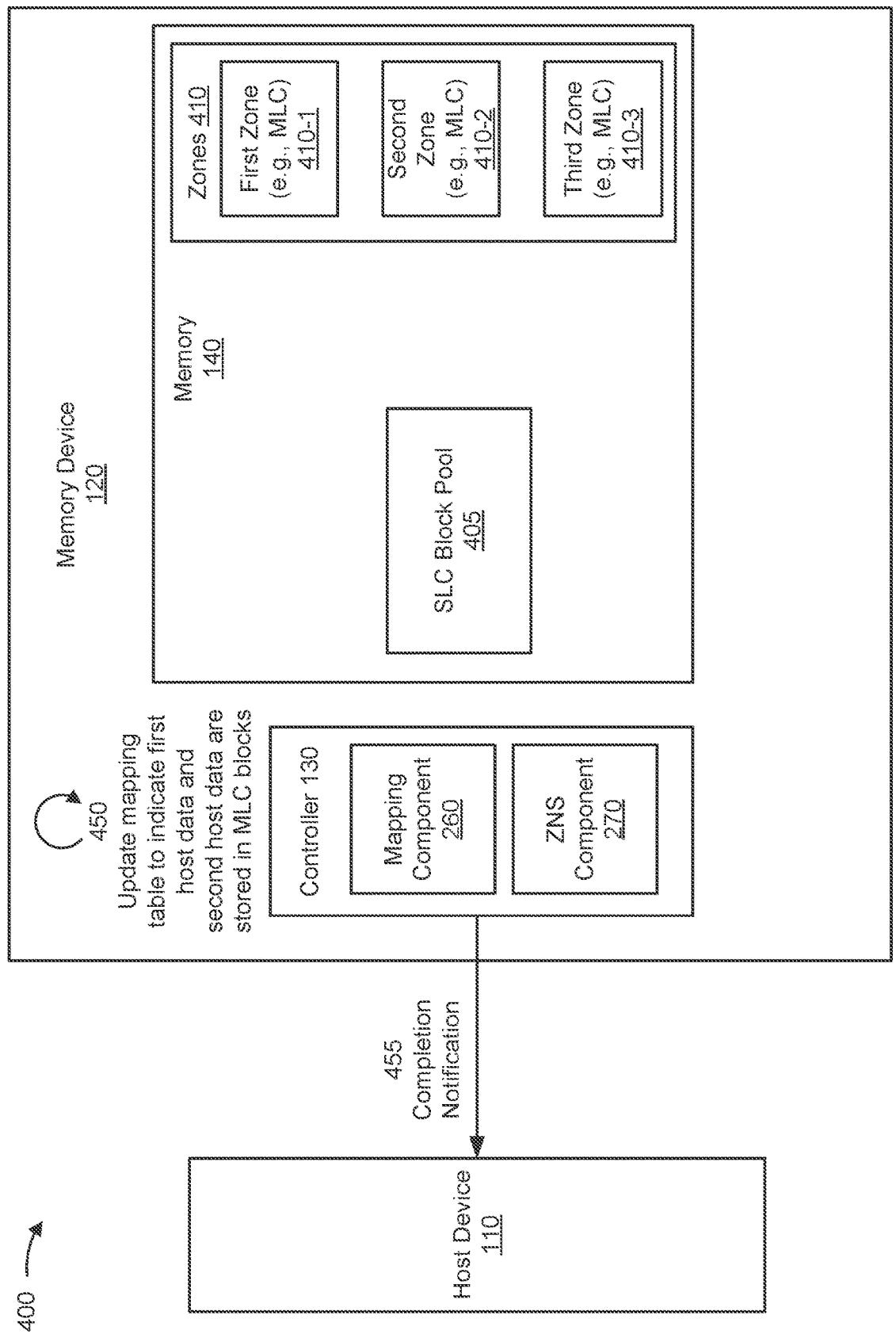
Figure 4D:
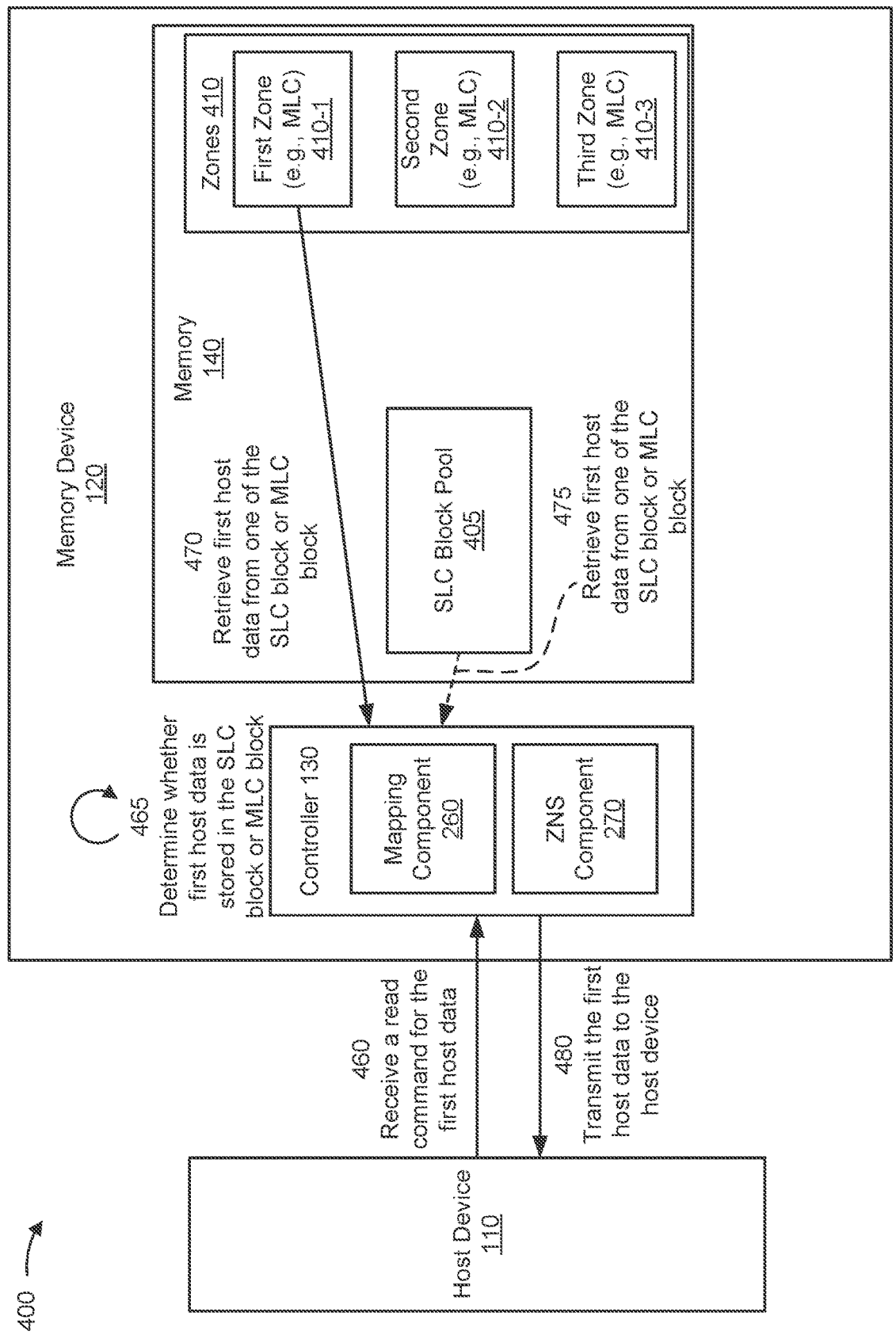
Figure 5:
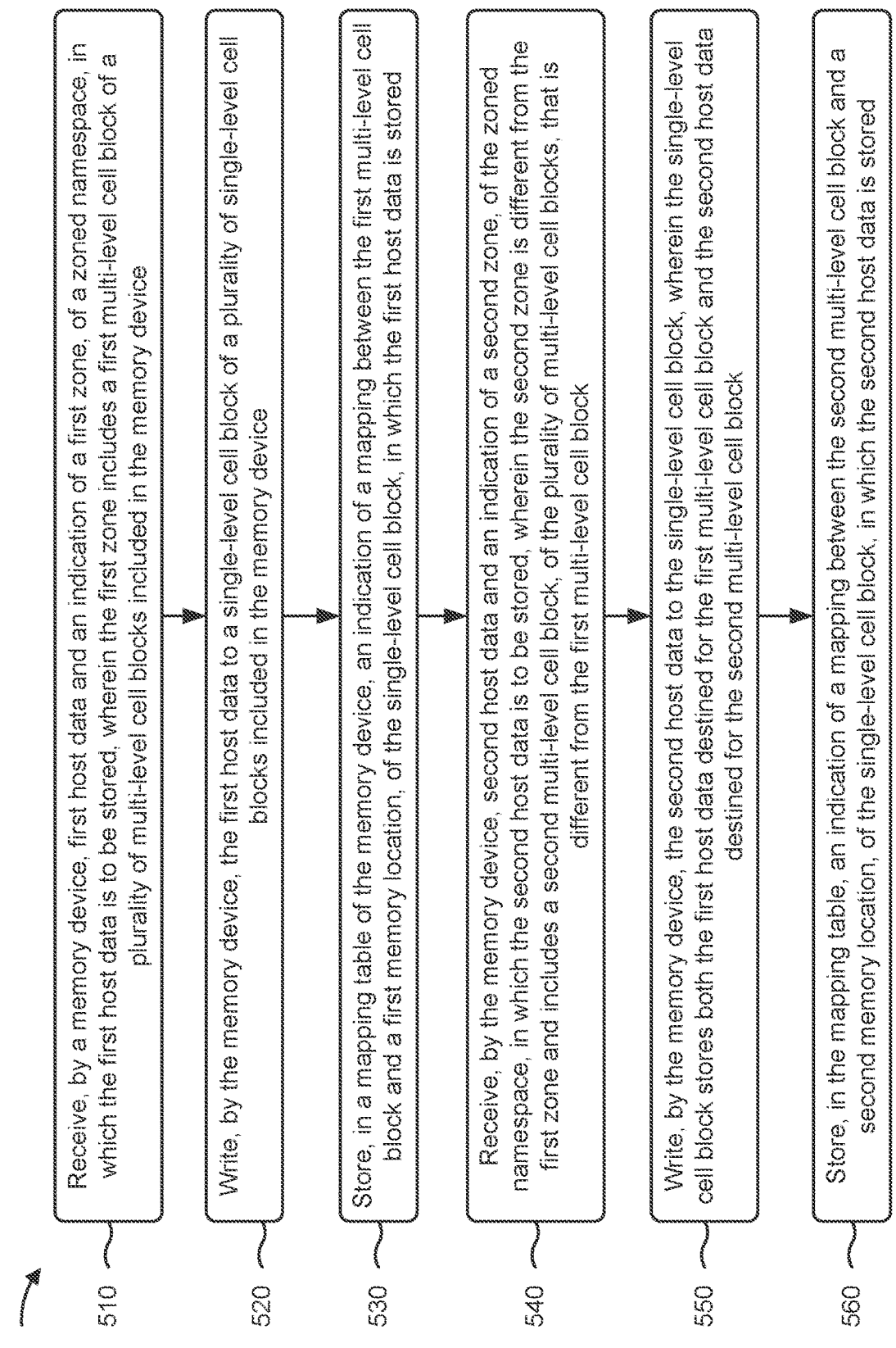
FIG. 5 is a flowchart of an example method associated with an SLC block storing data for migration to multiple MLC blocks.
Figure 6:
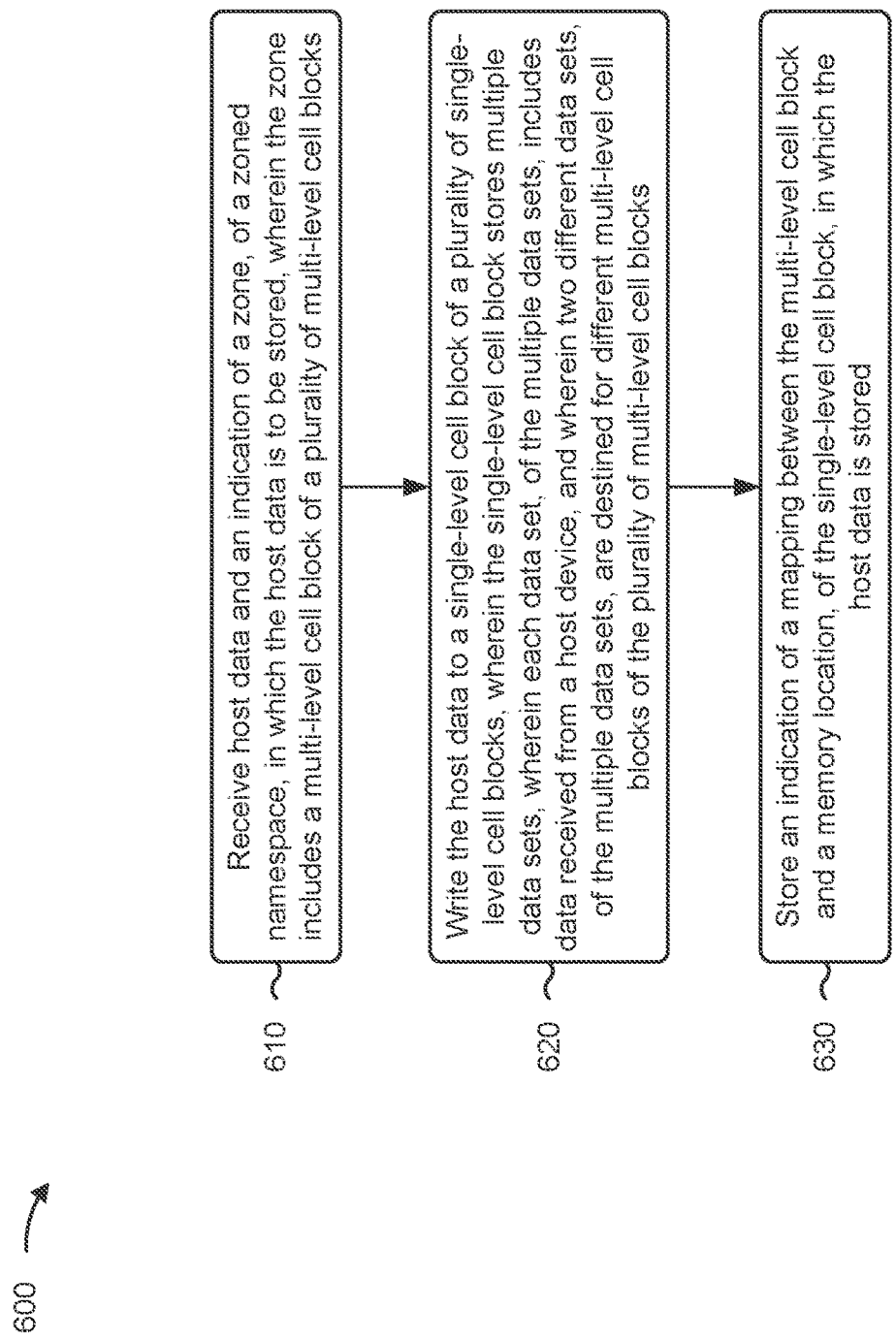
FIG. 6 is a flowchart of an example method associated with an SLC block storing data for migration to multiple MLC blocks.

One or more devices or components shown in FIG. 2 may be used to carry out operations described elsewhere herein, such as one or more operations of FIGS. 4A-4D and/or one or more process blocks of the methods of FIGS. 5-6. For example, the controller 130, the mapping component 260, and/or the ZNS component 270 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
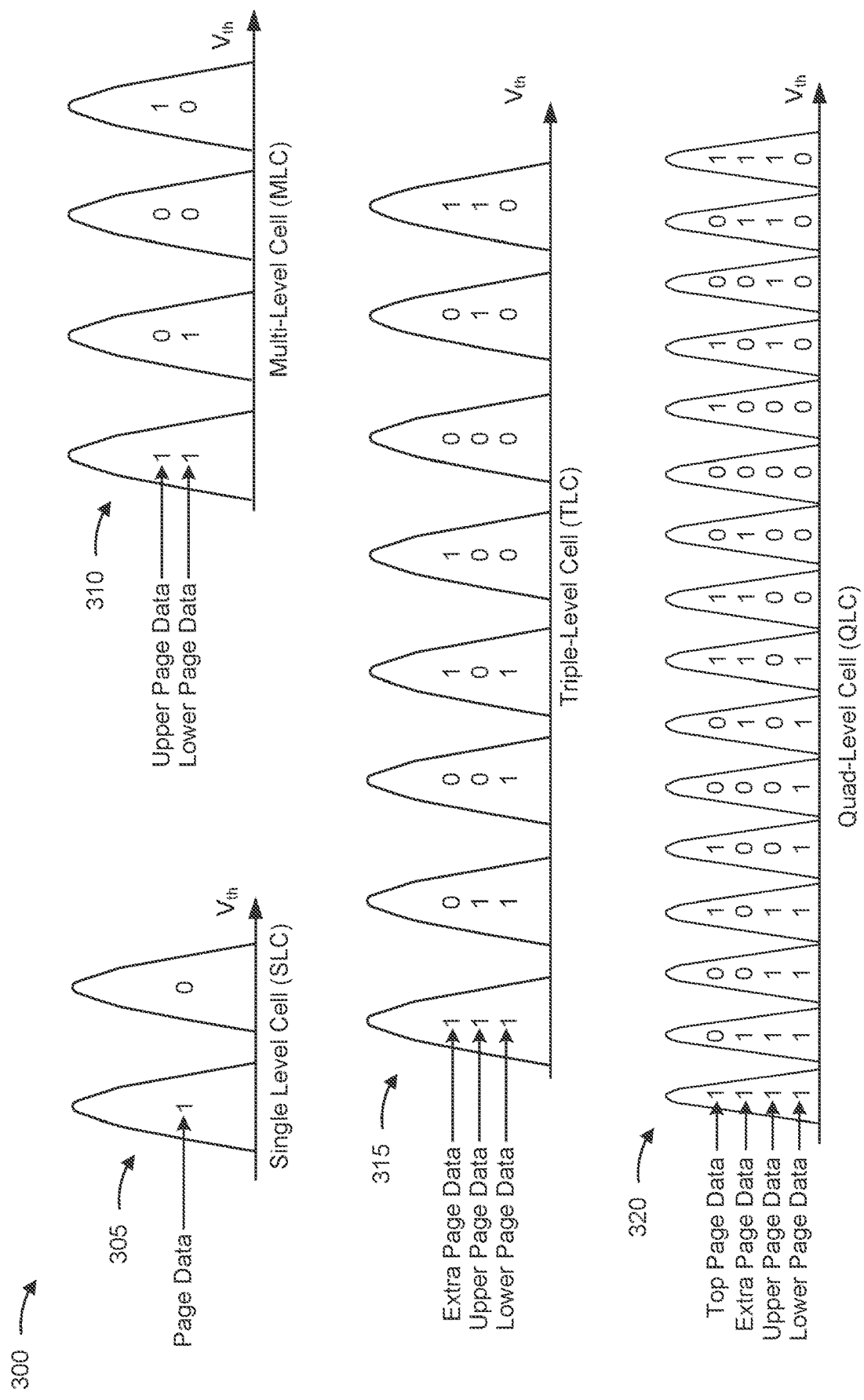
FIG. 3 is a diagram illustrating an example of SLC, MLC, triple-level cell, and quad level cell non-volatile memory.

FIG. 3 is a diagram illustrating an example 300 of SLC, MLC, triple-level cell (TLC), and QLC non-volatile memory. One or more of these memory types may be used by a memory device described herein.

In some cases, a non-volatile memory device, such as a NAND device, may store bits of data by charging or not charging memory cells, which may be capable of retaining a charge (e.g., electrons) even when no voltage is applied to the cell. For example, a non-volatile, solid-state memory device (e.g., a flash memory device) may include a floating gate transistor configured to store electrical charge. The floating gate transistor may be isolated above and below by insulating oxide layers. The floating gate transistor may be charged by applying a high voltage to a control gate proximate to a first (or top) insulating layer (sometimes called a gate oxide), which causes electrons from a substrate proximate to a second (or bottom) insulating layer (sometimes called a tunnel oxide) to tunnel through the second insulating layer and to the floating gate, which is sometimes referred to as tunneling or Fowler-Nordheim tunneling. Conversely, the floating gate transistor may be erased by applying a high voltage to the substrate, which causes electrons from the floating gate transistor to tunnel through the second insulating layer and to the substrate. A lack of charge in the floating gate transistor, a presence of a charge in the floating gate transistor, and/or a level of the charge in the floating gate transistor indicates a data state stored by the memory cell or floating gate transistor.

In other examples, a non-volatile, solid-state memory device (e.g., a flash memory device) may include a charge trap transistor configured to store electrical charge. In a charge trap type memory device, data is programmed or erased by providing or removing charges in or from a charge trap layer (e.g., a silicon-nitride (SiN) storage layer) through tunneling or injecting of electrons into the charge trap layer in a memory cell. The charge trap layer may be a dielectric material that can trap charges, thereby permitting the storage layer to be shared and continuous among the memory cells. Because in some implementations a word line is formed in the memory device by replacing one or more SiN films originally stacked in the memory device during a manufacturing process, charge trap memory devices are often referred to as replacement gate memory devices.

A non-volatile memory cell, such as a NAND cell, may be categorized as an SLC, an MLC, a TLC, or a QLC, among other examples. As shown by reference number 305, an SLC stores a single binary bit per memory cell, and thus may store either binary 1 or binary 0. In an SLC, the stored bit is sometimes referred to as the page data of the memory cell. When writing to an SLC, the cell may be charged to a threshold voltage (Vth) falling within the distribution of the curve labeled with page data "1" when the memory cell is to store binary 1 (or else may include no charge when the memory cell is to store binary 1), and may be charged to a threshold voltage falling within the distribution of the curve labeled with page data "0" when the memory cell is to store binary 0.

Unlike an SLC, which only stores a single bit, an MLC, a TLC, and a QLC may store multiple bits per memory cell. More particularly, as shown by reference number 310, an MLC stores two binary bits per memory cell, and thus is capable of storing binary 11, binary 01, binary 00, or binary 10 according to a level of a charged stored in the MLC. In an MLC, a first stored bit is sometimes referred to as the cell's upper page data, and the second stored bit is sometimes referred to as the cell's lower page data. When writing to an MLC, the cell may be charged to a threshold voltage falling within the distribution of the curve labeled with page data "11" when the memory cell is to store binary 11, the cell may be charged to a threshold voltage falling within the distribution of the curve labeled with page data "01" when the memory cell is to store binary a 01, the cell may be charged to a threshold voltage falling within the distribution of the curve labeled with page data "00" when the memory cell is to store binary 00, and the cell may be charged to a threshold voltage falling within the distribution of the curve labeled with page data "10" when the memory cell is to store binary 10. In some implementations, an MLC stores binary 11 when the MLC's charge is approximately 25% full, the MLC stores binary 01 when the MLC's charge is approximately 50% full, the MLC stores binary 00 when the MLC's charge is approximately 75%, and the MLC stores binary 10 when the MLC's charge is approximately 100% full. In some cases, "MLC" may alternatively be used to refer to any memory cell that stores two or more bits of data. Thus, "MLC" may refer to MLCs as described above, in addition to TLCs, QLCs, and higher level cells including cells capable of 4.5 bits of data per cell, penta-level cells (PLCs) capable of storing five bits of data per cell, or the like.

In a similar manner, and as shown by reference number 315, a TLC stores three binary bits per memory cell, and thus a TLC is capable of storing binary 111, binary 011, binary 001, binary 101, binary 100, binary 000, binary 010, or binary 110. For a TLC, the first, second, and third stored bits are sometimes referred to as the cell's "extra page data," the cell's "upper page data," and the cell's "lower page data," respectively. Moreover, as shown by reference number 320, a QLC stores four binary bits per memory cell, and thus is capable of storing binary 1111, binary 0111, binary 0011, binary 1011, binary 1001, binary 0001, binary 0101, binary 1101, binary 1100, binary 0100, binary 0000, binary 1000, binary 1010, binary 0010, binary 0110, or binary 1110. For a QLC, the first, second, third, and fourth bits are sometimes referred to as the cell's "top page data," the cell's "extra page data," the cell's "upper page data," and the cell's "lower page data," respectively.

More broadly, for an n-bit memory cell, the threshold voltage of the cell may be programmed to $2^n$ separate states, with each state corresponding to a non-overlapping threshold distribution, as shown for the various memory cells in FIG. 3. Moreover, for certain memory cells, a threshold voltage may be programmed using multiple write operations and/or passes, as described above. For example, for certain ZNS, replacement-gate-type memory cells, a coarse-write operation and/or pass may first be used, and then a fine-write operation and/or pass may be used. In such implementations, data may be cached in one type of cell (e.g., an SLC) before being fully migrated to another type of cell (e.g., an MLC, TLC, QLC, a 4.5 level cell, a PLC, or the like) in order to preserve the data across multiple power cycles or the like, as described above.

To read the data stored in a memory cell, such as an SLC, an MLC, a TLC, a QLC, a 4.5 level cell, a PLC, or another type of memory cell, a memory device 120 (or a component thereof) may sense a voltage associated with the stored charge on the memory cell (e.g., may sense a Vth associated with the cell) and determine a corresponding binary number associated with that voltage.

As indicated above, FIG. 3 is provided as an example. Other examples may differ from what is described with regard to FIG. 3.

FIGS. 4A-4D are diagrams of an example implementation 400 associated with an SLC block storing data for migration to multiple MLC blocks. As used in the context of FIG. 4, "MLC" may refer to a memory cell that stores two or more bits of data per memory cell, and thus refers to the MLC described in connection with reference number 310, and also to the TLC described in connection with reference number 315, the QLC described in connection with reference number 320, a 4.5 level cell, a PLC, or a memory cell storing more than five bits of data.

As shown in FIGS. 4A-4D, example implementation 400 includes the host device 110 and the memory device 120. The memory device 120 includes the controller 130 and the memory 140. The controller 130 may include the mapping component 260 and the ZNS component 270, among other components (e.g., the memory management component 250), and the memory 140 may include one or more blocks of memory cells, such as an SLC block pool 405 (e.g., an SLC cache), and one or more zones 410 associated with a ZNS (e.g., a first zone 410-1, a second zone 410-2, a third zone 410-3, or similar zones), with each zone 410 being associated with one or more MLC blocks. More particularly, each zone 410 may be an open and/or active zone of a ZNS and include, or otherwise be associated with, one or more MLC blocks that include MLCs (e.g., QLCs capable of storing four bits of data, PLCs capable of storing five bits of data, or the like) that are capable of storing data associated with the respective zone 410. In some implementations, at least two MLC blocks may correspond to a single zone 410 of the ZNS. In some implementations, an "open" and/or an "active" zone 410 means that the zone 410 is available to the host device 110 for storage of host data. In contrast, a "closed" and/or an "inactive" zone may be a zone of a ZNS that is not available for storage of host data, and thus is not associated with an SLC cache or the like. In this way, the memory device 120 may allocate SLC cache capacity for open and/or active zones 410, but may not need to allocate SLC cache capacity for closed and/or inactive zones because the host device 110 can only read from closed and/or inactive zones.

In some implementations, the first zone 410-1 may be associated with a first pool of one or more MLC blocks that include multiple MLCs, the second zone 410-2 may be associated with a second pool of one or more MLC blocks that include multiple MLCs, and/or the third zone 410-3 may be associated with a third pool of one or more MLC blocks that include multiple MLCs. In some implementations, the MLCs associated with each zone 410 may be capable of storing at least four bits of data (e.g., the MLCs may be at least QLCs). Moreover, in some implementations, the MLCs associated with each zone 410 may be associated with a replacement-gate-type or charge-trap-type transistor. Accordingly, each MLC may be capable of storing at least four bits of data using a replacement gate and/or a charge trap.

The SLC block pool 405 may include multiple SLC blocks, each including multiple SLCs, that are configured to store data prior to the data being written to one of the zones 410 and/or to MLC blocks associated with one of the zones 410. More particularly, in some implementations, multiple zones 410 and/or multiple MLC blocks may be associated with a single SLC cache, such as the SLC block pool 405. Put another way, each SLC block associated with the SLC block pool 405 may be capable of storing different data sets that are destined for storage in different MLC blocks of the multiple MLC blocks associated with the various open and/or active zones 410. This may free up space and/or capacity within the memory device 120 for use as long-term storage because the memory device 120 does not need to allocate a separate SLC cache for each open and/or active zone 410, and thus the capacity of the memory device 120 may be increased as compared to traditional ZNS memory devices supporting numerous open and/or active zones. More particularly, in a traditional ZNS type memory device, such as a QLC, ZNS memory device, the memory device includes an SLC cache corresponding to each zone, with a quantity of SLC blocks included in the SLC cache equal to four times a quantity of QLC blocks included in the corresponding zone. In the implementations described herein, however, because each SLC block associated with the SLC block pool 405 may be capable of storing different data sets that are destined for storage in different MLC blocks of the multiple MLC blocks associated with the various open and/or active zones 410, the memory device 120 does not need to maintain a quantity of SLC blocks equal to four times a quantity of QLC blocks included in the ZNS. Instead, in some implementations, a quantity of SLC blocks included in the SLC block pool 405 is less than four times a quantity of MLC blocks (e.g., QLC blocks) included in open and/or active zones 410. In some implementations, a quantity of SLC blocks included in the SLC block pool 405 may even be less than a quantity of MLC blocks included in open and/or active zones 410, such as when a host device 110 requires a very large number of open and/or active zones 410.

In some implementations, the memory device 120 may receive host data from the host device 110, and the memory device 120 may cache the data in one or more SLC blocks of the SLC block pool 405 prior to writing the host data to a corresponding zone 410 and/or one or more MLC blocks associated with a corresponding zone 410. More particularly, as shown by FIG. 4A, and as indicated by reference number 415, the controller 130 may receive, from the host device 110 (e.g., via host interface 150), host data to be written to a zone 410 (e.g., to an MLC block associated with an open and/or active zone 410). For example, the controller 130 may receive first host data that is destined for one of the open and/or active zones 410, such as the first zone 410-1, as well as second host data that is destined for another one of the open and/or active zones 410, such as the third zone 410-3. In some implementations, the controller 130 may also receive, from the host device 110, an indication of a corresponding zone 410 to which the host data is to be written. For example, the controller 130 may receive, from the host device 110, an indication that the first host data should be written to the first zone 410-1 and/or an indication that the second host data should be written to the third zone 410-3.

As shown by reference number 420, the controller 130 may write (e.g., via memory interface 160) the first host data and the second host data to an SLC cache, such as to SLC blocks associated with the SLC block pool 405. In this way, the SLC block pool 405 may serve as a repository for storing the host data prior to migrating the host data to a specific zone 410, such that the host data is preserved across power cycles during one or more write processes associated with writing the host data in MLCs associated with the zones 410. In some implementations, writing the host data to the SLC cache (e.g., the SLC block pool 405) may include striping the host data across multiple SLCs. More particularly, in some implementations, writing the first host data to the SLC block pool 405 may include striping the first host data across a first set of SLC blocks, and/or writing the second host data to the SLC block pool 405 may include striping the second host data across a second set of SLC blocks. In some implementations, the first set of SLC blocks may be the same SLC blocks as the second set of SLC blocks, while, in some other implementations, the first set of SLC blocks may be different SLC blocks than the second set of SLC blocks.

Moreover, as shown by reference number 425, the controller 130 (e.g., the mapping component 260 of the controller 130) may store an indication of a mapping between memory locations associated with the SLC block pool 405 and the corresponding destination zones 410 and/or MLC blocks associated with the destination zones, which may be used for later reference when migrating host data to a zone 410 and/or when retrieving host data from the SLC block pool 405 or one of the zones 410. For example, the mapping component 260 may store a mapping table that includes a multiple entries, with each entry indicating a mapping between a memory location in the SLC block pool 405 and a corresponding zone 410 and/or MLC block for which data stored in the memory location of the SLC block pool 405 is destined.

In some implementations, the memory device 120 (e.g., the controller 130 of the memory device 120, and, more particularly, the ZNS component 270 of the controller 130) may periodically migrate host data from the SLC cache (e.g., the SLC block pool 405) to one or more zones 410 of the ZNS. More particularly, as shown in FIG. 4B, and as indicated by reference number 430, the controller 130 may determine that host data stored in the SLC cache (e.g., the first host data and the second host data) should be migrated to the destination zones 410 of the ZNS and/or to MLCs associated with each zone 410 (e.g., QLC blocks associated with each zone 410). In some implementations, the controller 130 may determine that host data should be migrated from the SLC block pool 405 to the respective zone 410 based on the controller 130 determining that a size of the host data stored in the SLC block pool satisfies a threshold. In some implementations, the threshold may be based on an amount of data that an MLC block associated with a zone 410 is capable of storing. For example, host data may be migrated to a corresponding zone 410 once a size of the host data within the SLC cache (e.g., the SLC block pool 405) is large enough to fill half of an MLC block (e.g., half a QLC block), once a size of the host data within the SLC cache is large enough to fill an entire MLC block (e.g., once a size of the host date within the SLC cache is equal to an amount of data that the MLC block is capable of storing), or once a size of the host data within the SLC cache satisfies some other threshold.

In some implementations, based on determining that host data is to be migrated to a respective zone 410, the controller 130 (e.g., the mapping component 260 of the controller 130) may identify memory locations in the SLC block pool 405 where the host data is stored and/or may identify the destination memory locations (e.g., destination zones 410 and/or MLC blocks) where the host data is to be migrated, as indicated by reference number 435. For example, the mapping component 260 may identify memory locations of the SLC block pool 405 containing the first host data and the second host data and/or may identify the respective destination locations for the host data (e.g., the first zone 410-1 and the third zone 410-3, respectively) based on the mapping table.

As shown by reference numbers 440 and 445, the controller 130 may migrate host data from the SLC block pool 405 to one or more zones 410 and/or to one or more MLC blocks associated with one or more zones 410. More particularly, as shown by reference number 440, the controller 130 (e.g., the ZNS component 270 of the controller 130) may migrate the first host data from the SLC block pool 405 to the first zone 410-1 based on an entry in the mapping table mapping a first memory location in the SLC block pool 405 containing the first host data to the first zone 410-1. Additionally, or alternatively, as shown by reference number 445, the controller 130 may migrate the second host data from the SLC block pool 405 to the third zone 410-3 based on an entry in the mapping table mapping a second memory location in the SLC block pool 405 containing the second host data to the third zone 410-3.

As shown in FIG. 4C, and as indicated by reference number 450, in some implementations, the controller 130 (e.g., the mapping component 260 of the controller 130) may update the mapping table based on the migration of host data from the SLC block pool 405 to the one or more zones 410. For example, the controller 130 may update the mapping table to indicate that host data (e.g., the first host data and/or the second host data) has been migrated to one or more zones 410 and/or MLC blocks associated with one or more zones 410 and/or to indicate that the host data is no longer stored in the SLC block pool 405. More particularly, the mapping component 260 may update the mapping table to indicate that the first host data is stored in the first zone 410-1 and/or MLC blocks associated with the first zone 410-1, and/or to indicate that the second host data is stored in the third zone 410-3 and/or MLC blocks associated with the third zone 410-3. In some implementations, updating the mapping table may include invalidating the plurality of memory locations in the SLC block pool 405 that were used to cache the migrated host data based on migrating the host data from the plurality of memory locations to the corresponding zone 410 and/or MLC block. Moreover, the controller 130 (e.g., the memory management component 250 of the controller 130) may periodically perform one or more garbage collection operations on an SLC block associated with the SLC block pool 405 after the host data has been migrated from the SLC block to a zone 410 and/or an MLC block. In some implementations, as shown by reference number 455, the controller 130 may also transmit, to the host device 110 (e.g., via the host interface 150), a completion notification indicating that the host data has been migrated from an SLC cache (e.g., the SLC block pool 405) to a corresponding zone 410 of the ZNS and/or indicating that the plurality of memory locations in the SLC block pool 405 have been invalidated.

As shown by FIG. 4D, in some implementations the controller 130 may receive a read command for host data and may retrieve host data from either the SLC cache (e.g., the SLC block pool 405) or a zone 410 of the ZNS based on whether the host data has been migrated from the SLC cache to the ZNS. More particularly, as shown by reference number 460, the controller 130 may receive (e.g., via the host interface 150), from the host device 110, a read command for host data, such as, in the depicted implementation, a read command for the first host data. As shown by reference number 465, the controller 130 (e.g., the mapping component 260 of the controller 130) may determine whether the first host data is stored in an SLC block (e.g., the SLC cache and/or the SLC block pool 405) or in a zone 410 and/or an MLC block associated with a zone 410. More particularly, the mapping component 260 may reference an entry in the mapping table to determine if the first host data has been migrated to a zone 410 of the ZNS or whether it remains in the SLC cache. In the depicted implementation, the first host data has been migrated to the first zone 410-1, as described above in connection with reference number 440. Accordingly, in this implementation, the controller 130 may determine that the first host data is stored in an MLC block (e.g., an MLC block associated with the first zone 410-1).

As shown by reference numbers 470 and 475, the controller 130 may retrieve (e.g., via the memory interface 160) the first host data from one of the SLC block pool 405 or an MLC block associated with one of the zones 410. More particularly, because in this implementation the first host data has been migrated to the first zone 410-1, the controller 130 may retrieve the first host data from the first zone 410-1, as indicated by reference number 470. In some other implementations, if the first host data had not yet been fully migrated to the first zone 410-1 (e.g., if the controller 130 determined, based on the mapping table, that the first host data still resided in the SLC block pool 405), the controller 130 may retrieve the first host data from the SLC block pool 405, as indicated by reference number 475. In some implementations, when the host data being read still resides in the SLC block pool 405, the controller 130 may de-rate, or slow down, a read of the host data from an SLC block, because performing a read operation from an SLC block may be faster than performing a read operation from an MLC block (e.g., a QLC block). Thus, by de-rating a read of the host data from the SLC block, a timing of the read operation may match an expected timing of an MLC read, such as a QLC read or the like.

As shown by reference number 480, once the first host data has been retrieved from the one of the SLC block pool 405 or one of the zones 410, the controller 130 may transmit (e.g., via the host interface 150), and the host device 110 may receive, the first host data. Based on the memory device 120 storing host data associated with multiple MLC blocks and/or multiple zones in a single SLC cache, the memory device 120 may enable a large number of open and/or active zones to be presented to the host device while increasing MLC memory capacity by reducing the need for dedicated SLC caches for each open and/or active zone, among other benefits.

As indicated above, FIGS. 4A-4D are provided as an example. Other examples may differ from what is described with regard to FIGS. 4A-4D. The number and arrangement of devices shown in FIGS. 4A-4D are provided as an example. In practice, there may be additional devices, fewer devices, different devices, or differently arranged devices than those shown in FIGS. 4A-4D. Furthermore, two or more devices shown in FIGS. 4A-4D may be implemented within a single device, or a single device shown in FIGS. 4A-4D may be implemented as multiple, distributed devices. Additionally, or alternatively, a set of devices (e.g., one or more devices) shown in FIGS. 4A-4D may perform one or more functions described as being performed by another set of devices shown in FIGS. 4A-4D.

FIG. 5 is a flowchart of an example method 500 associated with an SLC block storing data for migration to multiple MLC blocks. In some implementations, a memory device (e.g., memory device 120) may perform or may be configured to perform one or more process blocks of FIG. 5. In some implementations, another device or a group of devices separate from or including the memory device (e.g., host device 110) may perform or may be configured to perform one or more process blocks of FIG. 5. Additionally, or alternatively, one or more components of the memory device (e.g., controller 130, memory 140, memory management component 250, mapping component 260, and/or ZNS component 270) may perform or may be configured to perform one or more process blocks of FIG. 5.

As shown in FIG. 5, the method 500 may include receiving first host data and an indication of a first zone, of a zoned namespace, in which the first host data is to be stored, wherein the first zone includes a first multi-level cell block of a plurality of multi-level cell blocks included in the memory device (block 510). As further shown in FIG. 5, the method 500 may include writing the first host data to a single-level cell block of a plurality of single-level cell blocks included in the memory device (block 520). As further shown in FIG. 5, the method 500 may include storing, in a mapping table of the memory device, an indication of a mapping between the first multi-level cell block and a first memory location, of the single-level cell block, in which the first host data is stored (block 530). As further shown in FIG. 5, the method 500 may include receiving second host data and an indication of a second zone, of the zoned namespace, in which the second host data is to be stored, wherein the second zone is different from the first zone and includes a second multi-level cell block, of the plurality of multi-level cell blocks, that is different from the first multi-level cell block (block 540). As further shown in FIG. 5, the method 500 may include writing the second host data to the single-level cell block, wherein the single-level cell block stores both the first host data destined for the first multi-level cell block and the second host data destined for the second multi-level cell block (block 550). As further shown in FIG. 5, the method 500 may include storing, in the mapping table, an indication of a mapping between the second multi-level cell block and a second memory location, of the single-level cell block, in which the second host data is stored (block 560).

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein, such as the operations described in connection with FIGS. 4A-4D.

FIG. 6 is a flowchart of an example method 600 associated with an SLC block storing data for migration to multiple MLC blocks. In some implementations, a memory device (e.g., memory device 120) may perform or may be configured to perform one or more process blocks of FIG. 6. In some implementations, another device or a group of devices separate from or including the memory device (e.g., host device 110) may perform or may be configured to perform one or more process blocks of FIG. 6. Additionally, or alternatively, one or more components of the memory device (e.g., controller 130, memory 140, memory management component 250, mapping component 260, and/or ZNS component 270) may perform or may be configured to perform one or more process blocks of FIG. 6.

As shown in FIG. 6, the method 600 may include receiving host data and an indication of a zone, of a zoned namespace, in which the host data is to be stored, wherein the zone includes a multi-level cell block of a plurality of multi-level cell blocks (block 610). As further shown in FIG. 6, the method 600 may include writing the host data to a single-level cell block of a plurality of single-level cell blocks, wherein the single-level cell block stores multiple data sets, wherein each data set, of the multiple data sets, includes data received from a host device, and wherein two different data sets, of the multiple data sets, are destined for different multi-level cell blocks of the plurality of multi-level cell blocks (block 620). As further shown in FIG. 6, the method 600 may include storing an indication of a mapping between the multi-level cell block and a memory location, of the single-level cell block, in which the host data is stored (block 630).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 4A-4D.

In some implementations, a memory device includes a plurality of multi-level cell blocks that include multi-level cells, wherein each multi-level cell included in the plurality of multi-level cell blocks is capable of storing at least four bits of data; a plurality of single-level cell blocks configured to store data prior to the data being written to one of the plurality of multi-level cell blocks, wherein each single-level cell block, of the plurality of single-level cell blocks, is capable of storing different data sets that are destined for storage in different multi-level cell blocks of the plurality of multi-level cell blocks; and a mapping component configured to store a mapping table that includes a plurality of entries, wherein an entry, of the plurality of entries, indicates a mapping between a memory location in the plurality of single-level cell blocks and a corresponding multi-level cell block for which data stored in the memory location is destined.

In some implementations, a method includes receiving, by a memory device, first host data and an indication of a first zone, of a zoned namespace, in which the first host data is to be stored, wherein the first zone includes a first multi-level cell block of a plurality of multi-level cell blocks included in the memory device; writing, by the memory device, the first host data to a single-level cell block of a plurality of single-level cell blocks included in the memory device; storing, in a mapping table of the memory device, an indication of a mapping between the first multi-level cell block and a first memory location, of the single-level cell block, in which the first host data is stored; receiving, by the memory device, second host data and an indication of a second zone, of the zoned namespace, in which the second host data is to be stored, wherein the second zone is different from the first zone and includes a second multi-level cell block, of the plurality of multi-level cell blocks, that is different from the first multi-level cell block; writing, by the memory device, the second host data to the single-level cell block, wherein the single-level cell block stores both the first host data destined for the first multi-level cell block and the second host data destined for the second multi-level cell block; and storing, in the mapping table, an indication of a mapping between the second multi-level cell block and a second memory location, of the single-level cell block, in which the second host data is stored.

In some implementations, an apparatus includes means for receiving host data and an indication of a zone, of a zoned namespace, in which the host data is to be stored, wherein the zone includes a multi-level cell block of a plurality of multi-level cell blocks included in the apparatus; means for writing the host data to a single-level cell block of a plurality of single-level cell blocks included in the apparatus, wherein the single-level cell block stores multiple data sets, wherein each data set, of the multiple data sets, includes data received from a host device, and wherein two different data sets, of the multiple data sets, are destined for different multi-level cell blocks of the plurality of multi-level cell blocks; and means for storing an indication of a mapping between the multi-level cell block and a memory location, of the single-level cell block, in which the host data is stored.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the term "approximately" means "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c). No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   a plurality of multi-level cell blocks that include multi-level cells,
      wherein each multi-level cell included in the plurality of multi-level cell blocks is capable of storing at least four bits of data;
   a plurality of single-level cell blocks configured to store data prior to the data being written to one of the plurality of multi-level cell blocks,
      wherein each single-level cell block, of the plurality of single-level cell blocks, is capable of storing different data sets that are destined for storage in different multi-level cell blocks of the plurality of multi-level cell blocks; and
   a mapping component configured to store a mapping table that includes a plurality of entries,
      wherein an entry, of the plurality of entries, indicates a mapping between a memory location in the plurality of single-level cell blocks and a corresponding multi-level cell block for which data stored in the memory location is destined.

2. The memory device of claim 1, wherein each multi-level cell block, included in the plurality of multi-level cell blocks, corresponds to a single zone of a zoned namespace.

3. The memory device of claim 1, wherein at least two multi-level cell blocks, included in the plurality of multi-level cell blocks, correspond to a single zone of a zoned namespace.

4. The memory device of claim 1, wherein a quantity of single-level cell blocks included in the plurality of single-level cell blocks is less than four times a quantity of multi-level cell blocks included in the plurality of multi-level cell blocks.

5. The memory device of claim 1, wherein a quantity of single-level cell blocks included in the plurality of single-level cell blocks is less than a quantity of multi-level cell blocks included in the plurality of multi-level cell blocks.

6. The memory device of claim 1, further comprising one or more components configured to:
   receive host data and an indication of a zone, of a zoned namespace, in which the host data is to be stored;
   write the host data to one or more single-level cell blocks of the plurality of single-level cell blocks; and
   store, in the mapping table, an indication of a mapping between one or more memory locations, of the one or more single-level cell blocks, in which the host data is stored, and a multi-level cell block for which the host data is destined, wherein the multi-level cell block corresponds to the zone.

7. The memory device of claim 1, further comprising one or more components configured to:
   determine that host data is to be migrated to a multi-level cell block of the plurality of multi-level cell blocks;
   identify, using the mapping table, a plurality of memory locations, of the plurality of single-level cell blocks, in which the host data destined for the multi-level cell block is stored; and
   migrate the host data from the plurality of memory locations to the multi-level cell block.

8. The memory device of claim 7, wherein the one or more components, to determine that the host data is to be migrated to the multi-level cell block, are configured to determine that a size of the host data stored in the plurality of memory locations satisfies a threshold.

9. The memory device of claim 8, wherein the threshold is based on an amount of data that the multi-level cell block is capable of storing.

10. The memory device of claim 8, wherein the threshold is equal to an amount of data that the multi-level cell block is capable of storing.

11. The memory device of claim 7, wherein the one or more components are configured to invalidate the plurality of memory locations based on migrating the host data from the plurality of memory locations to the multi-level cell block.

12. A method, comprising:
receiving, by a memory device, first host data and an indication of a first zone, of a zoned namespace, in which the first host data is to be stored,
  wherein the first zone includes a first multi-level cell block of a plurality of multi-level cell blocks included in the memory device;
writing, by the memory device, the first host data to a single-level cell block of a plurality of single-level cell blocks included in the memory device;
storing, in a mapping table of the memory device, an indication of a mapping between:
  the first multi-level cell block that includes a first destination memory location to which the first host data is to be migrated, and
  a first memory location, of the single-level cell block, in which the first host data is stored;
receiving, by the memory device, second host data and an indication of a second zone, of the zoned namespace, in which the second host data is to be stored,
  wherein the second zone is different from the first zone and includes a second multi-level cell block, of the plurality of multi-level cell blocks, that is different from the first multi-level cell block;
writing, by the memory device, the second host data to the single-level cell block,
  wherein the single-level cell block stores both the first host data destined for the first multi-level cell block and the second host data destined for the second multi-level cell block; and
storing, in the mapping table, an indication of a mapping between:
  the second multi-level cell block that includes a second destination memory location to which the second host data is to be migrated, and
  a second memory location, of the single-level cell block, in which the second host data is stored.

13. The method of claim 12, wherein each multi-level cell, of the plurality of multi-level cell blocks, is at least a quad-level cell.

14. The method of claim 12, further comprising:
storing, in the mapping table, an indication of the first destination memory location; and
storing, in the mapping table, an indication of the second destination memory location.

15. The method of claim 12, further comprising:
determining that the first host data and other host data are to be migrated to the first multi-level cell block,
  wherein the other host data is stored in one or more single-level cell blocks, of the plurality of single-level cell blocks, and is destined for the first multi-level cell block;
identifying, using the mapping table, a plurality of memory locations, of the plurality of single-level cell blocks, in which the first host data and the other host data are stored; and
migrating the first host data and the other host data from the plurality of memory locations to the first multi-level cell block.

16. The method of claim 15, further comprising:
identifying, using the mapping table, a respective destination memory location for each host data set to be migrated to the first multi-level cell block,
  wherein a host data set includes host data stored in a particular memory location; and
  wherein the first host data and the other host data are migrated to the first multi-level cell block based on identifying the respective destination memory location for each host data set.

17. The method of claim 15, further comprising updating the mapping table to indicate that the first host data and the other host data are stored in the first multi-level cell block based on migrating the first host data and the other host data to the first multi-level cell block.

18. The method of claim 12, further comprising:
receiving a read command for the first host data;
determining whether the first host data is stored in the single-level cell block or the first multi-level cell block; and
retrieving the first host data from one of the single-level cell block or the first multi-level cell block based on determining whether the first host data is stored in the single-level cell block or the first multi-level cell block.

19. The method of claim 12, wherein writing the first host data to the single-level cell block includes striping the first host data across a first set of single-level cell blocks that include the single-level cell block; and
  wherein writing the second host data to the single-level cell block includes striping the second host data across a second set of single-level cell blocks that include the single-level cell block.

20. An apparatus, comprising:
means for receiving host data and an indication of a zone, of a zoned namespace, in which the host data is to be stored,
  wherein the zone includes a multi-level cell block of a plurality of multi-level cell blocks included in the apparatus;
means for writing the host data to a single-level cell block of a plurality of single-level cell blocks included in the apparatus,
  wherein the single-level cell block stores multiple data sets,
  wherein each data set, of the multiple data sets, includes data received from a host device, and
  wherein two different data sets, of the multiple data sets, are destined for different multi-level cell blocks of the plurality of multi-level cell blocks;
means for storing an indication of a mapping between the multi-level cell block and a memory location, of the single-level cell block, in which the host data is stored; and
means for migrating the host data to the multi-level cell block after a condition is satisfied and using the indication of the mapping.

21. The apparatus of claim 20, further comprising means for storing an indication of whether the host data is stored in the single-level cell block or has been migrated to the multi-level cell block.

22. The apparatus of claim 20, further comprising:
means for receiving a read command for the host data;
means for determining that the host data is stored in the single-level cell block; and
means for de-rating a read of the host data from the single-level cell block based on determining that the host data is stored in the single-level cell block.

23. The apparatus of claim 20, further comprising means for performing one or more garbage collection operations on the single-level cell block after the host data has been migrated to the multi-level cell block.

24. The apparatus of claim 20, wherein each multi-level cell included in the plurality of multi-level cell blocks is capable of storing at least four bits of data, wherein the at least four bits of data are stored using a replacement gate.

25. The apparatus of claim 20, wherein each multi-level cell block, included in the plurality of multi-level cell blocks, corresponds to a single zone of a zoned namespace.

* * * * *